April 28, 1936.  L. C. ROTTER  2,038,762

LUBRICATING APPARATUS

Filed April 5, 1935

Lutwin C. Rotter,
Inventor.
Delos G. Haynes
Attorney.

Patented Apr. 28, 1936

2,038,762

UNITED STATES PATENT OFFICE 2,038,762

LUBRICATING APPARATUS

Lutwin C. Rotter, Glendale, Mo., assignor to Lincoln Engineering Company, St. Louis, Mo., a corporation of Missouri Application April 5, 1935, Serial No. 14,807

6 Claims. (Cl. 221—47.4)

This invention relates to lubricating apparatus, and with regard to certain more specific features, to portable, hand-operated apparatus of this class.

This invention is an improvement upon the apparatus disclosed in the United States Patent 1,971,778 issued to Alexander P. Fox and to William F. Boehm on August 28, 1934.

Among the several objects of the invention may be noted the provision of apparatus having an improved type of springless outlet valve which is positively prevented from exuding lubricant exteriorly of the device but which permits disassembly for filling and reassembly; and the provision of apparatus of this class which is compact and sturdy. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which are illustrated several of various possible embodiments of the invention, Fig. 1 is a longitudinal section showing a completely springless form of the invention;

Similar reference characters indicate corresponding parts throughout the several views of the drawing.

Figure 1:
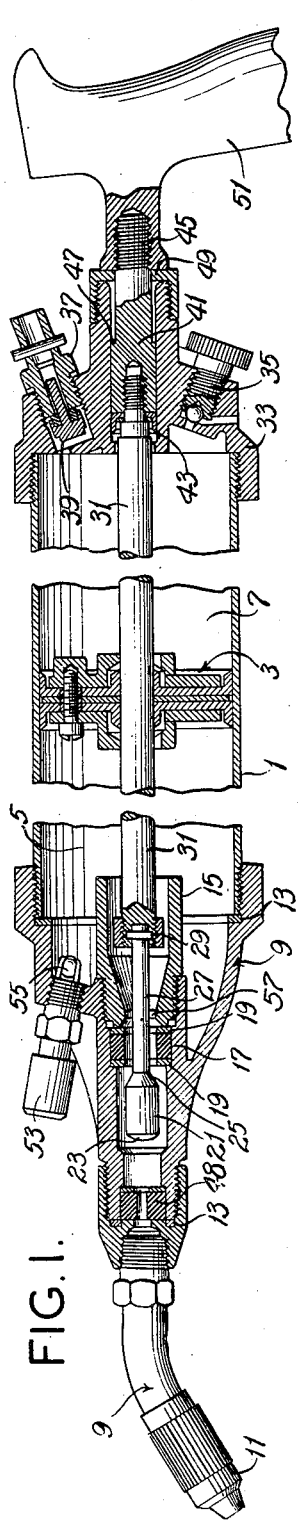

Referring now more particularly to Fig. 1, there is shown at numeral 1, a cylinder having therein a follower 3 which divides the cylinder 1 into a lubricant compartment 5 and an air compartment 7.

Removably screwed to the front end of cylinder 1 is an outlet head 9 provided with a nozzle 11 which is sealed by means of an internal packing 13.

Rearwardly the head 9 is provided with a guide 15 which is threaded into the head and holds in position an internal, cylindric packing seat 17, the latter being held between two metal washers 19. The packing seat 17 is preferably composed of a resilient material, the bore through which is approximately equal to or slightly less than the diameter of a cylindric valve 21. The valve 21 has a round guide nose 23 and a beveled rearward guide portion 25. The valve 21 is provided with an extension 27 which passes back to a joint 29, the latter permitting some movement between the extension 27 and extension rod 31. The rod 31 extends through said cylinder 1 and through the follower 3. It will be understood that the follower 3 has suitable sealing means both against the rod 31 and the cylinder 1.

Rearwardly, the cylinder 1 is provided with a head 33 having a release valve 35 and an air inlet fitting 37, the latter including a check valve 39.

The rearward end of the rod 31 is provided with a piston 41, operative in a cylinder in said head 33 and suitably sealed by means of a packing 43. The piston 41 has an extension 45 passing out of the head 33. A shoulder 47, cooperating with a cap 49 limits the rearward travel of the piston 41. Outside of the head 33, the extension 45 is provided with a suitable handle or grip 51 for operating the device.

Operation is as follows:

Assuming that the space 5 to the left of the follower 3 is filled with lubricant and the space 7 to the right is filled with air which was introduced through the fitting 37, the nozzle 11 is applied to that which is to receive lubricant. At this time the rod 31 is positioned to the right (which is alternative to the position shown in the drawing). This is because of the effect of the pressure at the rear end of the cylinder 1 which passes around the clearance between the rod 31 and the inner end of head 33.

The air pressure impinges upon the seal 43 of the piston 41 and therefore drives back the rod 31 with the extension 27 and valve 21. Under these conditions, the valve 21 is positioned within the packing seat 17. The pressure of air on the follower places hydrostatic pressure on the lubricant in the forward end of the cylinder 1 but this can not force the valve 21 forwardly, because the effective area exposed to pressure on said valve 21 is made lower than the effective area exposed to pressure on the piston 41, so that the preponderance of pressure is maintained to set the valve 21 into closed position. However, the preponderance is designed not to be so much that it would be difficult to effect opening operations.

Upon applying the nozzle 11 to a lubricant receiving fitting, the handle 51 is forced forwardly by the operator, thus overcoming the preponderance of pressure normally sending the rod 31 backward. This drives the valve 21 to the open position shown in Fig. 1 and the lubricant under pressure of air on the follower 3 is forced through the directing guide 15, packing seat 17 and out through the nozzle 11. When it is desired to shut off the flow, the pressure on handle 51 is released, and the parts returned to the positions above described, thus closing the valve 21.

As lubricant is consumed, the follower 3 works forwardly and finally rests against the end of the tube 15 whereby its outward motion is limited.

To refill the device, a lubricant pump may be attached to the inlet fitting 53 which has the inwardly opening check valve 55 associated therewith. The valve 35 in the rearward head is then open and the lubricant forces back the follower 3 while the air behind the follower 3 is exhausted from the valve 35. It is to be understood that at this time no air is allowed to flow into the fitting 37. After the follower 3 is back as far as it will go, the lubricant connection is broken at the inlet valve 53 and said valve automatically closes. The valve 35 is then closed and air under pressure is introduced into the inlet 37. Said air is trapped behind the follower 3 by the action of the valve 39. The device is then again ready for pumping action.

If an operator does not have a pressure pump for refilling, the head 9 may be unscrewed and removed, and this is possible because of the possibility of drawing the valve 21 entirely through the packing seat 17 and out through the guide 15, the opening 57 permitting this action. The cylinder then may be filled by means of a paddle, or the valve 35 may be opened and the follower 3 drawn rearwardly by unscrewing the cap nut 49 and withdrawing the rod 31 through the cylinder in head 33. The connection 29 will contact follower 3 moving it backward for the full length of cylinder 1. This action draws in a charge of lubricant when the lower end of the cylinder 1 is introduced into a grease supply.

The advantage of the loose connection 29 between the valve 21 and the rod 31 is that the valve may, upon assembly, adjust itself to its best position in the cylindric packing seat 17 for best sealing conditions without abnormally distorting said packing. The cylinder 15 also aids in guiding valve head 21 into proper position when a reassembly is made after having removed the head 9.

Among the advantages of the invention are the following:

1. The valve 21 which is at the forward end of the gun and operated from the rearward end thereof has no passages or bearings in the head 9 which will permit outward leakage of lubricant.

2. The head 9 may be disassembled for refilling without making any disconnection of the head of valve 21, because the same may be drawn through the cylindric portion of the packing seat 17.

3. The device is entirely springless in the preferred form and springless as to the outlet valve 21 in all forms.

Figure 2:
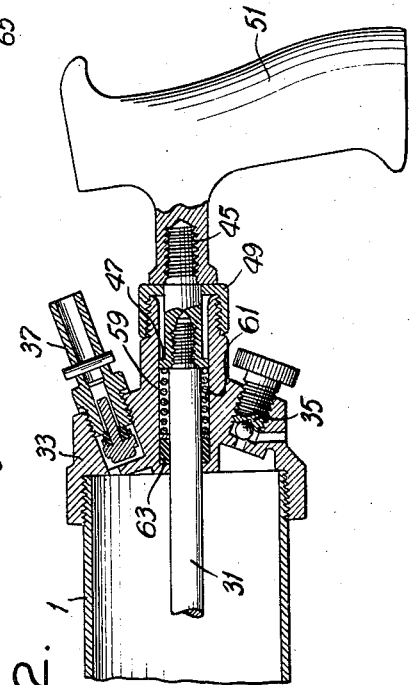
Fig. 2 is a fragmentary view similar to Fig. 1, showing a modification.

In Figure 2 is shown a modification in which like numerals designate like parts. In this form of the invention, piston 41 with its packing 43 is eliminated and there is substituted therefor a return spring 59 operating in a counterbore 61 which is sealed at 63 to prevent air from the cylinder 1 leaking outwardly around the spring. While this change introduces a spring which is not used in the preferred form (Fig. 1), still the return action of the valve to closed position is independent of the pressure in the cylinder 1. The advantage of the non-leaking valve 21 is retained.

Figure 3:
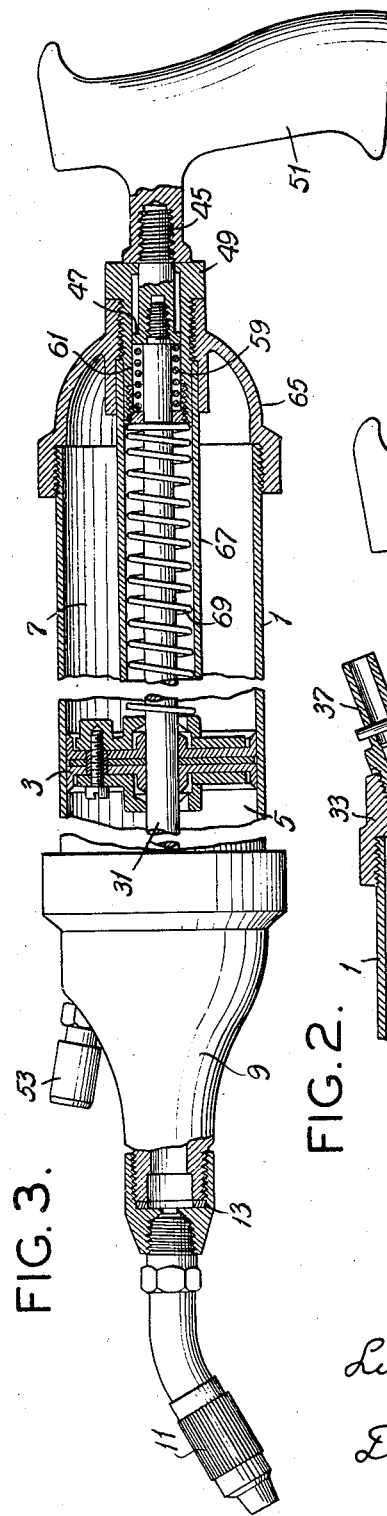
Fig. 3 is a fragmentary view similar to Fig. 1 showing another modification.

In Figure 3 is shown another form of the invention in which all use of compressed air is eliminated, the spring 59 being retained. The packing 63 of course is not necessary, because there is no air to be packed against leakage. Furthermore, the rearward head 65 is entirely redesigned because of the lack of the necessity for the fitting 37 and the valve 35 of the forms of the invention shown in Figs. 1 and 2.

In this last form, the head 65 is provided with an inwardly extending cylinder 67 in which is bottomed a spring 69 reacting against the follower 3. The follower 3 is driven by this spring 69, instead of by air. The form of the invention shown in Figure 3 is also different from that shown in Figure 1 by the elimination of the inner packing 48 and substitution therefor of washer 13.

The invention accordingly comprises the elements and combinations of elements, features of construction, and arrangements of parts which will be exemplified in the structures hereinafter described, and the scope of the application of which will be indicated in the following claims.

As many changes could be made in carrying out the above constructions without departing from the scope of the invention, it is intended that all matter contained in the above description or shown in the accompanying drawing shall be interpreted as illustrative and not in a limiting sense.

I claim:

1. In lubricating apparatus, a cylinder, a removable outlet head on one end of said cylinder, another head on the other end, a cylindric outlet valve seat in said outlet head adapted to receive lubricant from said cylinder, a cylindric valve cooperating with said seat, and operating means passing from said valve to the other head, means externally of the said other head for forcing the valve to an open position in a direction away from said cylinder, and means converging toward the valve and extending toward the cylinder and adapted to guide the valve into the seat upon assembly of the removable head with the cylinder.

2. In lubricating apparatus, a cylinder, a removable outlet head thereon, a valve in said head comprising a cylindric seat, a cylindric valve head adapted to engage inwardly with said seat to form a closure, means for operating said valve from a remote point on the cylinder and articulating means connecting said valve head and said remote control means which allows independent motion of the valve head with respect to said control means, whereby the valve may independently seek a seat.

3. In lubricating apparatus, a supply cylinder, a removable outlet head thereon, a valve in said head comprising a cylindric seat, a cylindric valve head adapted to engage inwardly with said seat to form a closure, means for operating said valve from a remote point on the cylinder and means connecting said valve head and said remote control means which allows independent motion of the valve head with respect to said control means whereby the valve may independently seek a seat, and guiding means attached inwardly on the outlet head for receiving and guiding the valve head into said seat upon applying the outlet head to the supply cylinder.

4. In a lubricating apparatus, a supply cylinder, a removable outlet head thereon, a follower in the cylinder, a valve in said head comprising a cylindric seat, a cylindric valve head adapted to engage inwardly with said seat to form a closure, means for operating said valve head from a remote point on the cylinder, means surrounding the inlet to the valve adapted to guide the valve head to the seat when assembling said head with said cylinder, and means extending into the supply cylinder a distance adapted when the head is attached to the cylinder, to prevent said follower from ultimately assuming a position outside of said cylinder.

5. In a lubricant gun, a cylinder, a movable follower therein dividing it into an air pressure compartment and a lubricant compartment, a head enclosing the lubricant compartment and having an outlet, a control member passing through said follower, a push-type grip on the control member, means normally returning the control member to its farthest position from the gun, the gun being adapted to be supported by said grip and its outlet pushed into contact with lubricant receiving fittings by pushing said grip toward the gun, a cylindric valve seat in said outlet, a cylindric valve normally cooperating interiorly with said valve seat when the grip is pushed away from the gun and adapted to be forced outwardly from the seat when the grip is pushed toward the gun in pushing said outlet to a lubricant receiving fitting.

6. In a lubricant gun, a cylinder, a movable follower therein dividing it into an air pressure compartment and a lubricant compartment, a head enclosing the lubricant compartment and having an outlet, a control member passing through said follower, a push-type grip on the control member, means normally returning the control member to its farthest position from the gun, the gun being adapted to be supported by said grip and its outlet pushed into contact with lubricant receiving fittings by pushing said grip, a cylindric valve seat in said outlet, a cylindric valve normally cooperating interiorly with said valve seat when the grip is pushed away from the gun and adapted to be forced outwardly from the seat when the grip is pushed toward the gun in pushing said outlet to a lubricant receiving fitting, and means for removably holding said head to the cylinder.

LUTWIN C. ROTTER.